Jan. 27, 1925.

H. W. HYDE 1,524,437

SPRING SUSPENSION FOR AUTOMOBILES

Filed Sept. 29, 1921  3 Sheets-Sheet 1

INVENTOR:
Henry Webb Hyde
by Macleod, Calver, Copeland & Dike
ATTYS.

Jan. 27, 1925.　　　　　　　　　　　　　　　　1,524,437
H. W. HYDE
SPRING SUSPENSION FOR AUTOMOBILES
Filed Sept. 29, 1921　　　　3 Sheets-Sheet 2

INVENTOR:
Henry Webb Hyde
by Macleod, Calver, Copeland & Dike
Attys

Jan. 27, 1925.
H. W. HYDE
1,524,437
SPRING SUSPENSION FOR AUTOMOBILES
Filed Sept. 29, 1921   3 Sheets-Sheet 3
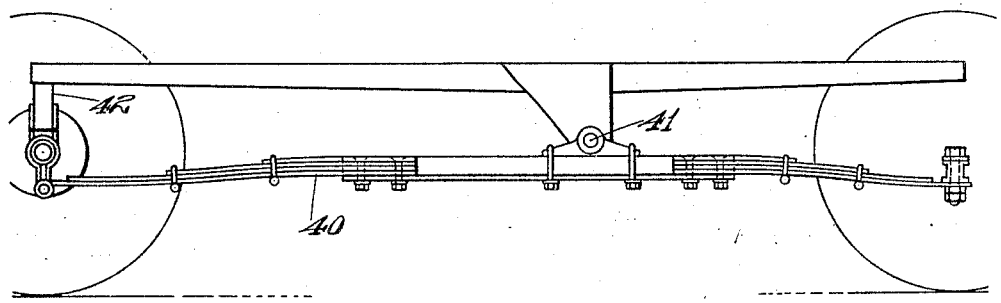
Fig_5_
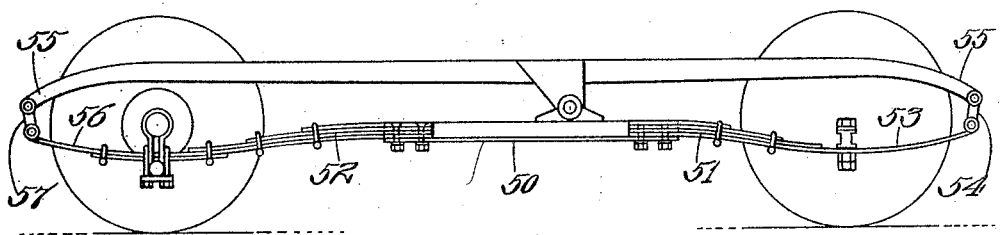
Fig_7_
INVENTOR:
Henry Webb Hyde
by Macleod, Calver, Copeland & Dike
ATTYS_

Patented Jan. 27, 1925.

1,524,437

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR AUTOMOBILES.

Application filed September 29, 1921. Serial No. 504,160.

*To all whom it may concern:*

Be it known that I, HENRY WEBB HYDE, a citizen of the United States, residing at North Cohasset, county of Norfolk, State of Massachusetts, have invented a certain new and useful Improvement in Spring Suspensions for Automobiles, of which the following is a specification, reference being had therein to the accompanying drawings.

My present invention relates to spring suspensions for automobiles and has for its object to provide a spring suspension which will neutralize the effects of rough roads to a greater extent than heretofore. The invention is particularly adapted for vehicles having a relatively short wheel base which are uncomfortable and fatiguing on rough or uneven roads, especially when driven at high speed. While the spring suspension embodying my invention is particularly adapted for use with short wheel base vehicles, it is however not limited to this class of vehicles, as it is found that it improves greatly the riding qualities of larger vehicles.

The invention consists primarily of providing the vehicle with longitudinal springs or spring reaches, to the ends of which the axles are connected and in supporting the body on the spring reaches by a single horizontal pivotal connection intermediate the ends of the spring reaches, so that the body can rock independently of the reaches, and movement of either front or back wheels in a vertical direction will not tend to move the body about the pivot.

The use of a single pivot or its equivalent as a connection between the body or frame of the vehicle and each of a pair of spring reaches, is believed to be an essential feature of my invention, since I have found that if a rigid connection is used in place of the pivot or if the body is prevented swinging about the pivot, the vehicle immediately becomes as hard riding as one provided with an ordinary spring suspension.

I find in practice that the spring suspension embodying my invention produces a surprising improvement in the riding qualities of the vehicle to which it is applied. When properly designed, it eliminates the sudden pitching and jerking which is the most fatiguing and unpleasant movement common to automobiles. Instead of a pitching movement, the vehicle provided with this spring has a gentle rising and falling motion. There is also an almost complete absence of side-sway or rolling. The jar and vibration due to a series of small obstructions in the road is largely absorbed by the spring suspension, and little or none of it is transmitted to the body. This fact is apparent not only because the vehicle rides more smoothly but also because it can be driven at a much greater speed over a given piece of rough road without increased discomfort to the occupants. The reasons why these superior results are obtained will be readily apparent from a study of the forces involved and the effects of these forces on the springs and body. It is sufficient to say that the construction doubles the flexibility of the spring system without decreasing the resistance to rolling or side-swaying or, to state the matter in another way, the pivot between the spring reaches and the body permits the reaction from a blow on one wheel to be transmitted directly to the portion of the spring reaches on the other side of the pivot without passing through the body. Furthermore, the resilience of both tires comes into play directly in absorbing the shock at either end of the vehicle, and the amount of unsprung weight is reduced.

The spring suspension embodying my invention is not more expensive to manufacture than the ordinary semi-elliptical or platform springs commonly employed, and vehicles so equipped steer as satisfactorily as those equipped with semi-elliptical or other standard forms of springs.

In this specification, I have employed the phrase "spring reaches" as a comprehensive term to describe members connected at their opposite ends with the axles respectively, extending in a general longitudinal direction, and composed wholly or in part of springs. The term, therefore, except as otherwise limited, includes a unitary spring extending from one axle to the other as well as a reach composed of a substantially rigid beam having spring end members in the form of attached springs. It will be understood that when the spring reach is thus constructed, the connection between the beam and the springs is rigid, there being no pivotal or yielding connection at this point.

The invention will be fully understood from the following description when taken in connection with the accompanying drawings, and the novel features thereof will be pointed out and clearly defined in the claims at the close of this specification.

In the drawings, Fig. 1 is a side elevation of a spring suspension embodying my invention in its preferred form.

Fig. 5 is a side elevation of a spring suspension particularly intended for runabouts.

Fig. 7 shows still another embodiment of my invention.

Figure 1:
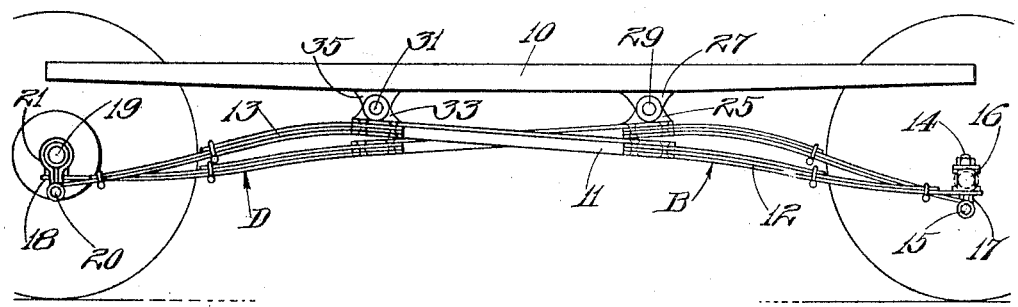
Figure 2:
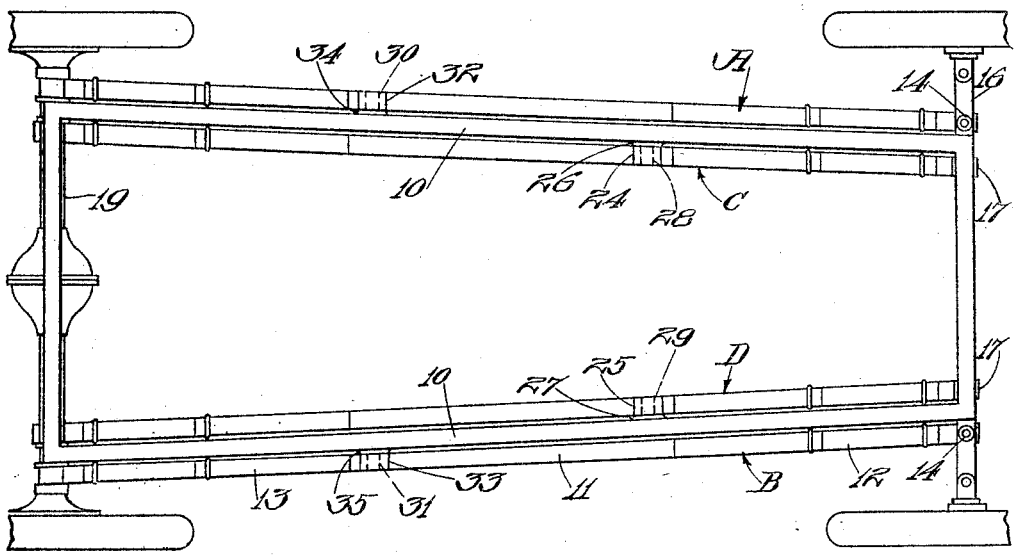
Fig. 2 is a plan view of the spring suspension shown in Figure 1.

Referring now to the drawings and particularly to Figures 1 and 2, there is therein shown a spring suspension in the form which I prefer for touring cars and other vehicles in which the load is likely to be unevenly and variably distributed lengthwise of the vehicle. The necessity for taking into consideration this change in distribution of weight will be understood when it is recalled that touring cars are sometimes driven with the tonneau full of passengers and at other times with the tonneau empty and that the distribution of load is an important factor in the operation of all spring suspensions. In vehicles of this class, I prefer to employ two pairs of spring reaches, to both of which the vehicle body is pivoted, the whole constituting a duplication of the simplest embodiment of my invention.

The four spring reaches comprising the said two pairs are designated A, B, C and D, of which A and B constitute one pair, while C and D constitute the other. Each of these reaches consists of a substantially rigid steel beam 11, to each end of which is rigidly secured a series of spring leaves of proper shape, as shown at 12 and 13. In practice, I employ three leaves at each end. The bottom leaf at the front end of each of the outside reaches A and B is rigidly secured to the front axle as by a bolt 14, while the bottom leaf at the front end of each of the inside reaches C and D rests on a roller 15 suspended below the front axle 16 by a loop 17. This arrangement provides for unequal elongation of the reaches for reasons which will be apparent hereafter. At the rear of the vehicle, a reverse arrangement is employed. The inside reaches C and D are bolted at 18 to the rear axle 19, while the outside reaches A and B rest on rollers 20 suspended by loops 21 from the rear axle.

The inside reaches C and D carry upwardly extending lugs 24 and 25 cooperating with downwardly extending lugs 26 and 27 on the vehicle body supporting frame 10, and these lugs are connected by two pivots 28 and 29 which are in line with each other horizontally and form an axis on which the frame can rock with relation to this pair of reaches. This axis is located forward of the centre of gravity of the vehicle body. The outside pair of reaches A and B are likewise connected to the frame 10 by pivots 30 and 31 engaging respectively two pairs of lugs 32 and 33, and 34 and 35. These pivots are located behind the centre of gravity of the vehicle body.

In practice, the pivots 28 and 29, and 30 and 31 are so placed that the distance from the rear axle to the rear axis is about one-fourth of the wheel base, while the distance from the front axis to the front axle is about one-third of the wheel base. These are convenient proportions for a usual distribution of weight in the vehicle, but are subject to change according to conditions.

Figure 3:
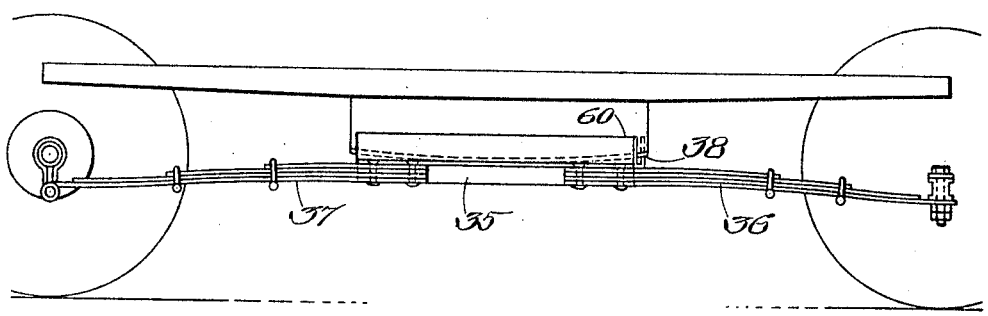
Fig. 3 is a side elevation of a spring suspension embodying my invention in modified form.
Figure 4:
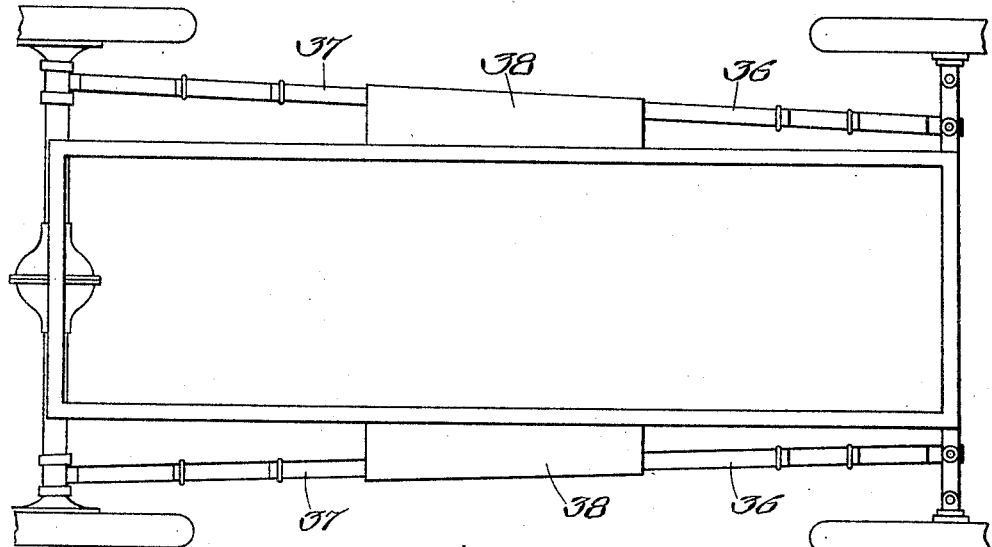
Fig. 4 is a plan view of the device shown in Figure 3.

Referring now to Figures 3 and 4, there is shown therein another spring suspension embodying my invention to be employed with vehicles which have varying distribution of load lengthwise of the vehicle. This form of spring suspension has only a single pair of spring reaches but the body is connected therewith by means of a movable fulcrum so that the point of application of the load to the spring reaches can vary lengthwise as the distribution of the load varies.

In the type of spring suspension shown in Figures 3 and 4, the two spring reaches are composed of beams 35 and springs 36 and 37 at the forward and rear ends respectively. The body is supported on the beams by means of a rocker 38 resting in a U-shaped trough 60 on the beam. The rocker forms a movable fulcrum.

Figure 6:
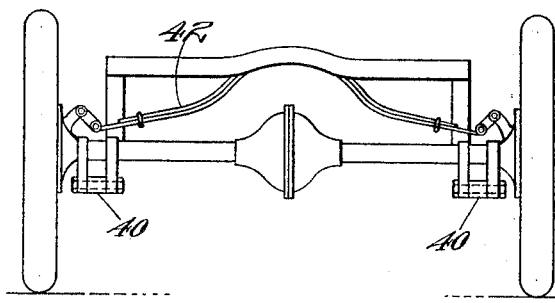
Fig. 6 is a rear elevation of the parts shown in Fig. 5.

In Figures 5 and 6, I have shown an embodiment of my invention which is particularly applicable to vehicles in which the variation in the distribution of weight lengthwise of the vehicle is not great enough to require a suspension of the type shown in the preceding figures. In this case, I employ a single pair of spring reaches, one of which is shown at 40 in Figure 5, a single pair of pivots 41 and a rear balancing spring 42, the latter being interposed between the rear axle and the rear end of the body. The pivots 41 are placed in a position determined by the probable distribution of weight. In the ordinary runabout, I find that the pivot should be slightly forward of the center of gravity, the distance in front and in back of the pivot being substantially as six is to four.

The operation of the spring suspension embodying my invention will perhaps be best understood from this embodiment of my invention. In the ordinary vehicle, whether provided with elliptical, semi-elliptical or cantilever springs, the springs are in effect rigidly secured to the body or frame and any shock or blow on the wheel due to unevenness in the road which causes the wheel to rise or fall suddenly, is communicated directly to the body and to the end thereof so connected with the wheel which receives such shock or blow. In the spring suspension embodying my invention on the contrary, if the front wheel is raised, owing to an unevenness in the road, the tendency is for the spring reach to turn about the pivot on which the body is supported, but not to rock the body about the pivot. It thus tends to swing the rear end of the reach and rear axle downward about the pivot, so that the chief effect of the blow is absorbed by the rear spring and pneumatic tire on the rear wheel. Likewise, when the rear wheel goes over an obstruction or drops into a hole, the front spring member and front wheel receive the major part of the reaction and the body is affected relatively little. The effect on the body is merely to lift the pivot and consequently the body vertically and not to rock it from front to back so that the body is not given any pitching motion. The action described is permitted by the pivot connecting the body with the spring reaches. If there were a rigid connection at this point, the blow would give the body an entirely different movement and would not be absorbed by the opposite end of the spring reach.

This angular stability of the body is not affected, when the rear axle rises, by the balancing springs 42, which are relatively light and sufficient only substantially to offset the eccentric mounting of the body. This action will be understood by considering the positions of the pivot 41 and spring 42 with reference to the centre of gravity of the body, which lies between these two members, so that simultaneous movement of said members in the same direction results in the application of forces to said body in the same direction and at opposite sides of the centre of gravity, so as to tend to neutralize one another. If, therefore, the rear wheel be raised, the pivot 41 and spring 42, which engage the body at opposite sides of the centre of gravity thereof, will both be raised, thereby gently raising the body as a whole to a slight extent without materially pitching or rocking the same. The spring 42 being relatively light, the greater part of the shock is absorbed thereby without being transmitted to the body, so that the moment of the slight upward force exerted thereby at a relatively long distance from the centre of gravity is substantially balanced by the considerably greater upward force applied at a less distance through the pivot 41, and the moments of the two forces substantially balance one another, as above stated.

When, on the other hand, the front axle rises, the upward force exerted upon the body by the rocking of the reaches is transmitted to the body solely at its point of pivotal connection with the reaches, said body maintaining its substantially horizontal position by its inertia, and the balancing springs merely expanding to the extent permitted by the lifting of a greater or less portion of the weight of the rear end of the body therefrom, so that said springs merely follow the upward movement of the body without exerting any additional upward or downward force thereon.

It will be seen that the arrangement is such that when any of the upward forces referred to are discontinued, the parts return freely to their usual positions also without pitching of the body.

It will also be noted that the balancing springs, being between the axle and the body, are beyond the resilient portions of the spring reaches, in the direction away from their pivotal connection with the body, thereby enabling the parts to operate as above explained and avoiding any downward pull upon the body through the balancing springs when the adjacent resilient portions of the spring reaches straighten under flexure occasioned by an upward force applied at the front of the vehicle.

In Figure 7, I have shown a slightly different embodiment of my invention. In this case, there is a single pair of reach rods 50 with front and back springs 51 and 52 respectively. The lower leaf 53 of the front spring is extended forward of the axle and connected to a shackle 54 the upper end of which is secured to the frame 55 at the front end of the horn. Likewise the lower leaf 56 of the rear spring 52 is extended beyond the rear axle and connected by a shackle 57 to the rear horn of the frame 55. The spring leaves 53 and 56 constitute relatively light front and rear balancing springs. This construction makes auxiliary cross springs unnecessary and may be employed when it is desirable to position the front and rear axles more positively. In Figure 7 as in Figure 5 the pivotal or rocking connection between the body and the spring reaches is shown as being located forward of the centre of gravity of the body.

What I claim is:

1. A spring suspension for motor vehicles including a pair of spring reaches, a connection between said spring reaches and the body about which the body is free to rock, said connection being located at one side of the centre of gravity of the body, and a balancing spring for the end of the body at the opposite side of the centre of gravity.

2. The spring suspension for motor vehicles including a pair of spring reaches arranged lengthwise of the vehicle, a single horizontal, transverse, pivotal connection between the body and the said reaches, located forward of the center of gravity of the body, and spring means connecting the rear axle and the body at a point to the rear of said pivotal connection.

3. A spring suspension for motor vehicles including a pair of spring reaches, a connection between said spring reaches and the body about which the body is free to rock, said connection being located at one side of the centre of gravity of the body, and a balancing spring for the end of the body at the opposite side of the centre of gravity, said balancing spring being located beyond the resilient portions of said spring reaches.

4. A spring suspension for vehicles including a pair of spring reaches connected at their opposite ends with the axles, and a freely rocking connection between said reaches and the body intermediate the ends of the vehicle, said parts being so constructed and arranged as to cause vertical forces applied to one end of the vehicle to be transmitted to the body solely through said rocking connection.

5. In a vehicle having axles and a body, a spring suspension including a pair of spring reaches each connected at its opposite ends with the axles respectively, and means, including a freely rocking connection between the reaches and the body, for applying vertical forces to the body at opposite sides of the centre of gravity thereof when one of said axles is raised with respect to the other.

6. In a vehicle, the combination with the axles and body, of a pair of spring reaches connected at their opposite ends with the axles, and means, including a freely rocking connection between the body and reaches and an additional connection between the body and one of said axles for moving said body in a substantially rectilinear vertical direction when said last named axle is raised with respect to the other.

7. In a vehicle, the combination with the axles and body, of a pair of spring reaches connected with the axles and having a connection with the body at one side of the center of gravity thereof and permitting free rocking movement between the body on the one hand and the reaches and axles on the other, and means connecting said body on the one hand and the reaches and axles on the other for transmitting to the body forces tending to rotate the body about its center of gravity in the opposite direction to the forces acting through said rocking connection.

8. In a vehicle, the combination with the axles and body, of a pair of spring reaches connected at their opposite ends with the axle and each comprising a rigid central beam member and spring end members, a freely rocking connection between the body and the rigid members of the reaches, said connection being located at one side of the centre of gravity of the body, and a balancing spring for the end of the body at the opposite side of the centre of gravity.

9. In a vehicle, the combination with the axles and body, of a pair of spring reaches connected at their opposite ends with the axles and each comprising a rigid central beam member and spring end members, a freely rocking connection between the body and the rigid members of the reaches, said connection being located at one side of the centre of gravity of the body, and a balancing spring interposed between the axle and the body at the end of the vehicle at the opposite side of the centre of gravity.

10. In a vehicle, the combination with the axles and body, of a pair of spring reaches connected at their opposite ends with the axles and each comprising a rigid central beam member and a spring end members, a freely rocking connection between the body and the rigid members of the reaches, said connection being located at one side of the centre of gravity of the body, and a transverse balancing spring interposed between the body and the axle at the end of the vehicle at the opposite side of the centre of gravity.

11. A spring suspension for motor vehicles including a pair of spring reaches connected at their opposite ends with the axles and each comprising a rigid member and spring end members, a freely rocking connection between the body and the rigid members of the reaches, said connection being in front of the centre of gravity of the body, and a balancing spring for the rear end of the body.

12. In a vehicle, the combination with the axles and body, of a pair of spring reaches connected at their opposite ends with the axles and each comprising a rigid central beam member and spring end members, a freely rocking connection between the body and the rigid members of the reaches, said connection being in front of the centre of gravity of the body, and a transverse balancing spring for the rear end of the body interposed between the body and the rear axle.

In testimony whereof I affix my signature.

HENRY WEBB HYDE.